United States Patent
Hansen

(10) Patent No.: US 8,240,268 B2
(45) Date of Patent: Aug. 14, 2012

(54) WATERCRAFT WITH STEPPED HULL AND OUTBOARD FINS

(75) Inventor: William M. Hansen, Port Orchard, WA (US)

(73) Assignee: Safe Boats International L.L.C., Bremerton, WA (US)

( * ) Notice: Subject to any disclaimer, the term of this patent is extended or adjusted under 35 U.S.C. 154(b) by 150 days.

(21) Appl. No.: 12/815,909

(22) Filed: Jun. 15, 2010

(65) Prior Publication Data

US 2010/0313808 A1 Dec. 16, 2010

Related U.S. Application Data

(60) Provisional application No. 61/187,644, filed on Jun. 16, 2009.

(51) Int. Cl.
*B63B 1/32* (2006.01)
(52) U.S. Cl. ........................ 114/289; 114/291
(58) Field of Classification Search .................. 114/288, 114/289, 291
See application file for complete search history.

(56) References Cited

U.S. PATENT DOCUMENTS

| | | | |
|---|---|---|---|
| 1,121,006 A | 12/1914 | Fauber | |
| 1,858,030 A | 5/1932 | Batty | |
| 2,396,721 A | 3/1946 | Patterson | |
| 2,634,698 A | 4/1953 | Becker | |
| 3,316,874 A | 5/1967 | Canazzi | |
| 4,027,613 A | 6/1977 | Wollard | |
| 4,903,626 A | 2/1990 | Haines | |
| 4,924,797 A * | 5/1990 | Solia | 114/288 |
| 5,452,676 A * | 9/1995 | Fiore | 114/291 |
| 5,647,297 A * | 7/1997 | Hansen | 114/283 |
| RE36,879 E | 9/2000 | Schoell | |
| 6,250,246 B1 | 6/2001 | Hubley | |
| 6,666,160 B1 | 12/2003 | Örneblad | |
| 2002/0162498 A1* | 11/2002 | Robinson et al. | 114/288 |
| 2011/0056425 A1* | 3/2011 | Campbell et al. | 114/289 |

FOREIGN PATENT DOCUMENTS

| | | |
|---|---|---|
| JP | 63-142294 U | 9/1988 |
| JP | 01-282086 A | 11/1989 |
| JP | 06-122390 A | 5/1994 |

OTHER PUBLICATIONS

International Search Report and Written Opinion mailed Feb. 24, 2011, issued in corresponding International Application No. PCT/US2010/038737, filed Jun. 15, 2010, 7 pages.

* cited by examiner

*Primary Examiner* — Stephen Avila
(74) *Attorney, Agent, or Firm* — Christensen O'Connor Johnson Kindness PLLC

(57) ABSTRACT

A watercraft (99) having a stepped hull (100) including a forward hull portion (103), a first stepped hull portion (106), and optionally a second stepped hull portion (108). Outboard ram air fins (120) extend outwardly from the hull and downwardly along the stepped hull portions. Outboard strakes (110, 112) are fixed to the stepped hull portions, and may be tapered to define ports thereto. During planing operation the channels defined by the fins compress the incoming air which is thereby at least partially forced under the stepped hull portion. In level operation the flow through the channels tends to keep the stepped hull portions in good contact with the water.

18 Claims, 6 Drawing Sheets

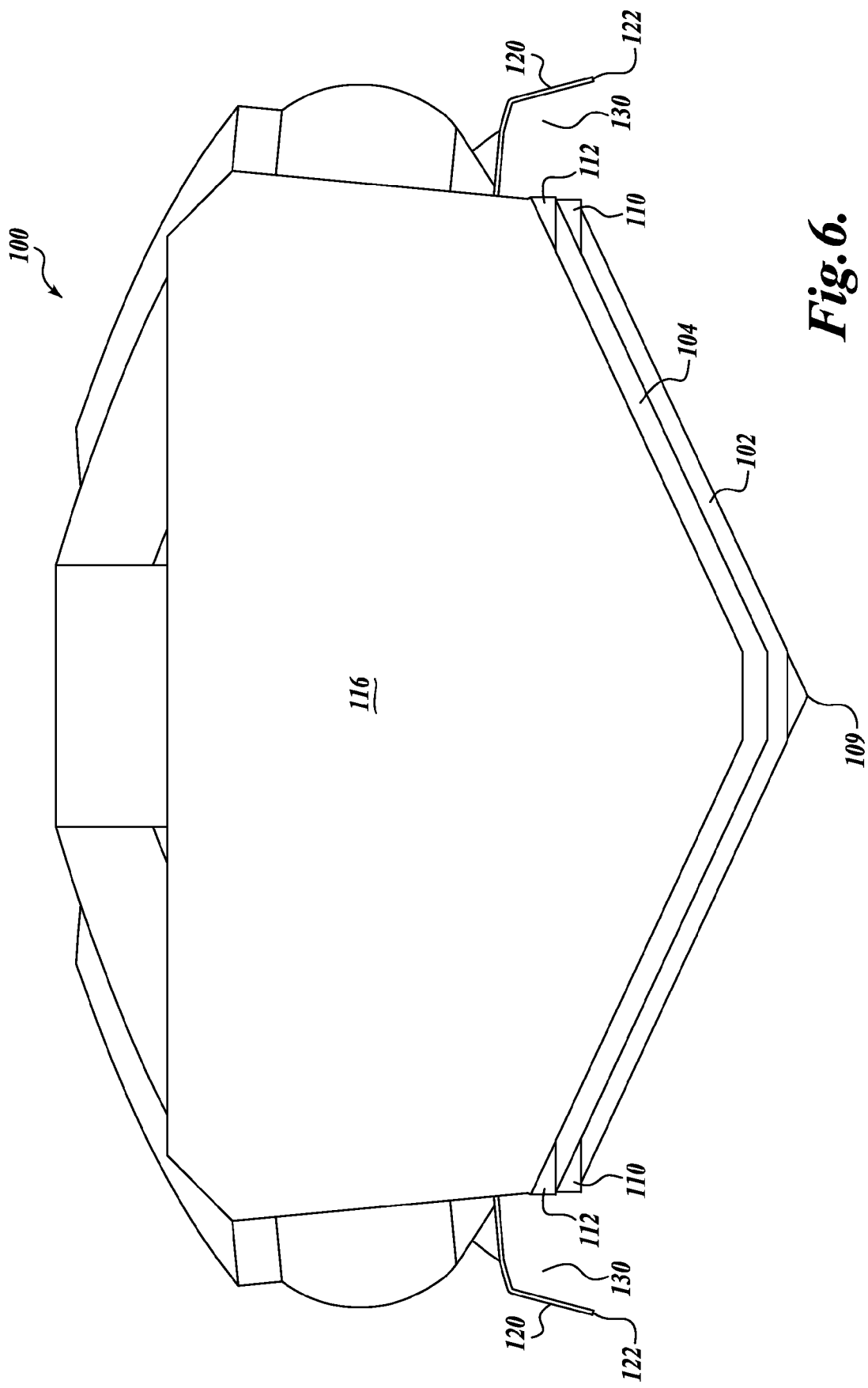

WATERCRAFT WITH STEPPED HULL AND OUTBOARD FINS

CROSS-REFERENCE TO RELATED APPLICATION

This application claims the benefit of Provisional Application No. 61/187,644, filed Jun. 16, 2009, the entire disclosure of which is hereby incorporated by reference herein.

BACKGROUND

As well-described in U.S. Pat. No. 6,666,160, to Örneblad, "since man first ventured onto water in boats, he has tried to design hulls that increase speed without unduly sacrificing stability." One avenue for reducing the hydrodynamic drag on a hull, and therefore improve hull efficiency in high-performance watercraft, is to provide a stepped hull wherein the lower surface of the hull is not a smooth surface, but rather includes transverse steps. Stepped hulls can be used to improve the performance of a hull by improving the on-plane performance characteristics, thereby reducing the wetted surface of the hull. Stepped hulls have been known for years, including, for example, U.S. Pat. No. 1,121,006, to Fauber, U.S. Pat. No. 1,858,030, to Batty, and U.S. Pat. No. 6,250,246, to Hubley, each of which is hereby incorporated by reference.

Fauber discloses a hull having a plurality of stepped portions, or "hydroplane members," and an internal air duct system for delivering air under pressure to the stepped portions of the hull, for example, using the drive IC engine as a pump to force air into the internal air duct system. Hubley discloses an internal air duct system having entry openings near the bow of the hull and exit openings in the face of a step on the hull. These forced air systems assist in avoiding producing a vacuum in the stepped hull portions, and in lifting the hull out of the water, reducing the wetted area.

However the internal duct systems are relatively complicated to incorporate into a hull. Also, a common problem with stepped hulls are that during turns the boat may tend to spin generally about the step on the hull, particularly when a forced air system is tending to lift the aftward portion of the hull away from the water.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A high-performance planing watercraft with a stepped hull is disclosed. A pair of outboard fins are fixed to the hull side walls. The fins extend outwardly and downwardly towards the water. Preferably the fins extend downwardly at least to the level of the stepped hull portion. The outboard fins each define a channel and are configured such that during planing operation the channel is angled with respect to the incoming air, such that the air is compressed in the channel and is thereby forced at least partially toward the stepped hull portion, thereby reducing the wetted surface area. In level operation the outboard fins are relatively level, and flow through the channels tends to create a vacuum which helps to maintain the stepped hull portion in good contact with the water.

In an embodiment of the watercraft the fins are generally L-shaped, having a first leg extending outwardly from the hull and a second leg extending downwardly from the first leg.

In an embodiment of the watercraft a pair of oppositely disposed outboard strakes are attached to the stepped hull portion. The strakes may be tapered near the front end, to provide a port or flow path to facilitate air flow to and from the stepped hull portion.

In an embodiment of the watercraft the fin's leading edge is forward of the stepped hull portion and extends to the transom, for example, extending along 30% to 50% of the length of the hull.

In an embodiment of the watercraft a second stepped hull portion is provided, which is upwardly offset from the first stepped hull portion, and may further comprise a second set of strakes along the outboard edges thereof.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is a rear view of the hull shown in FIG. 2.

DETAILED DESCRIPTION

Figure 1:
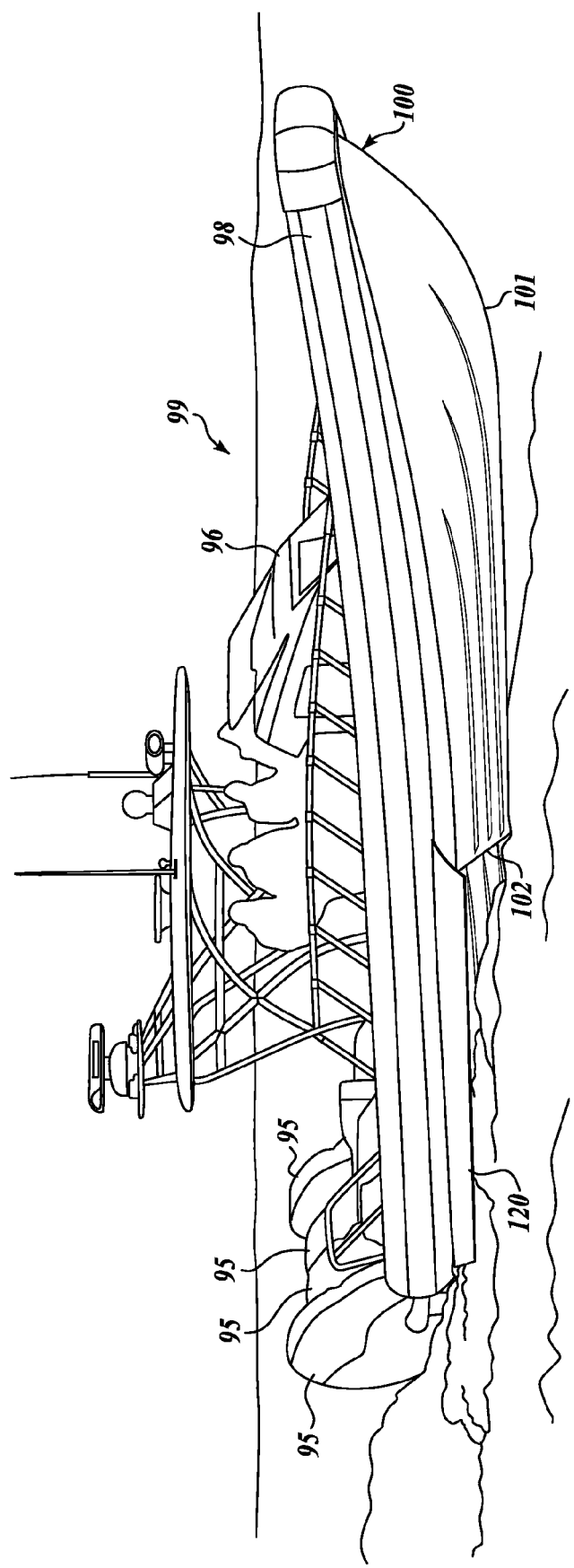
FIG. 1 is a perspective view of a watercraft having a stepped hull with performance fins in accordance with the present invention.

A high-performance watercraft 99 in accordance with the present invention is shown operating at planing speeds in FIG. 1. The watercraft 99 includes a stepped planing hull 100 having oppositely disposed port and starboard performance fins, referred to herein as ram air fins 120, located on an aft portion of the hull 100. The ram air fins 120 extend longitudinally along the stepped portion of the hull 100. This exemplary embodiment generally corresponds with the Apostle™ Series high-performance watercraft manufactured by SAFE Boats International L.L.C. (www.safeboats.com), although the present invention may be applied to various watercraft by persons of skill in the art.

The hull 100 in a current embodiment is formed primarily from aluminum, and may be, for example, from 29 feet to 42 feet in length. Other hull sizes are also contemplated. An optional foam sponson 98 is shown disposed about the upper perimeter of the hull 100. A control console 96 with the operator controls is disposed approximately mid-ship, and a plurality of outboard motors 95 (four shown) provide propulsion. It will be readily apparent to persons of skill in the art that other lengths, construction materials, number and type of motors, and the like, may be used without departing from the present invention.

Figure 2:
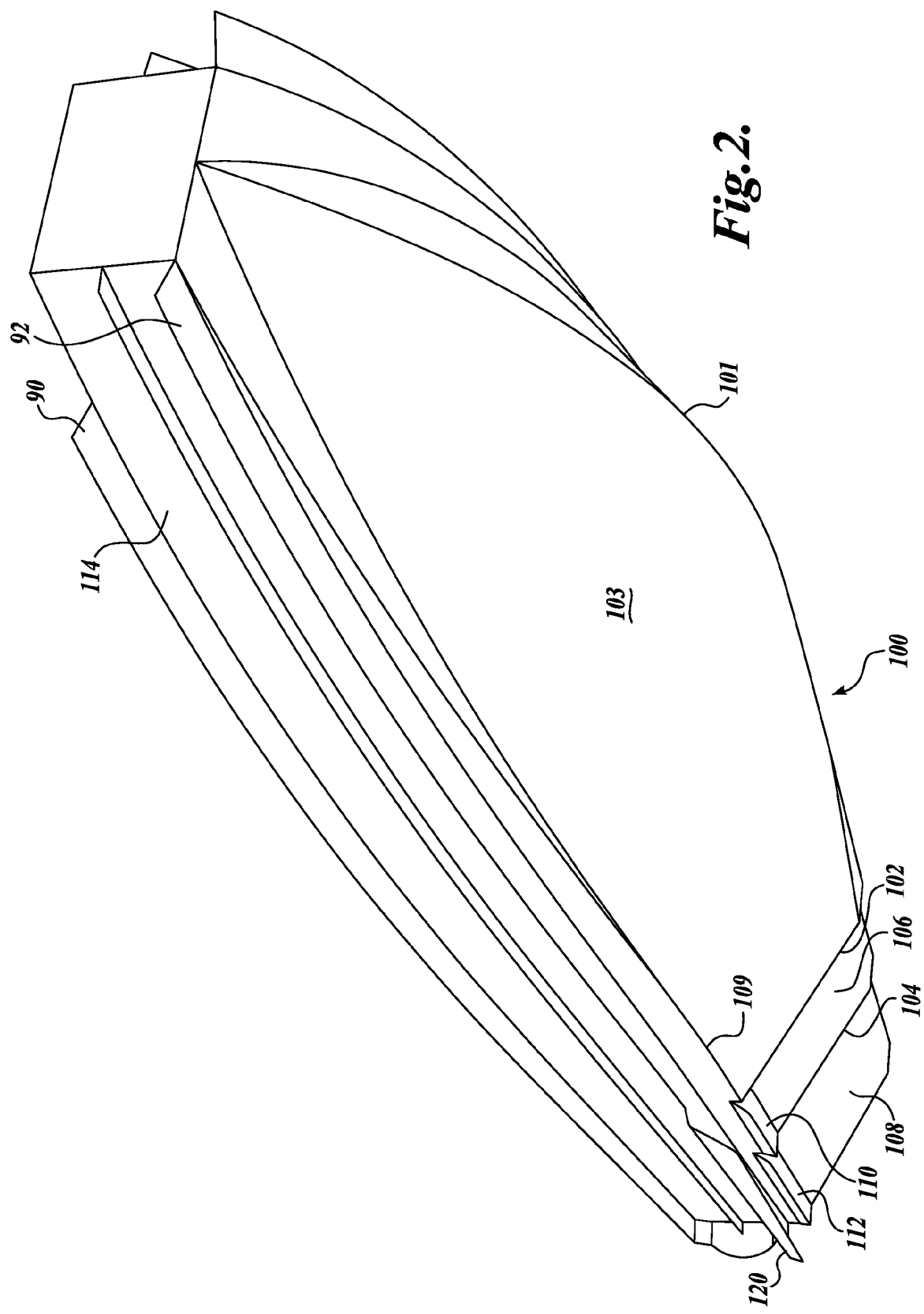
FIG. 2 is a perspective front, left, lower view of the hull of the watercraft shown in FIG. 1.
Figure 3:
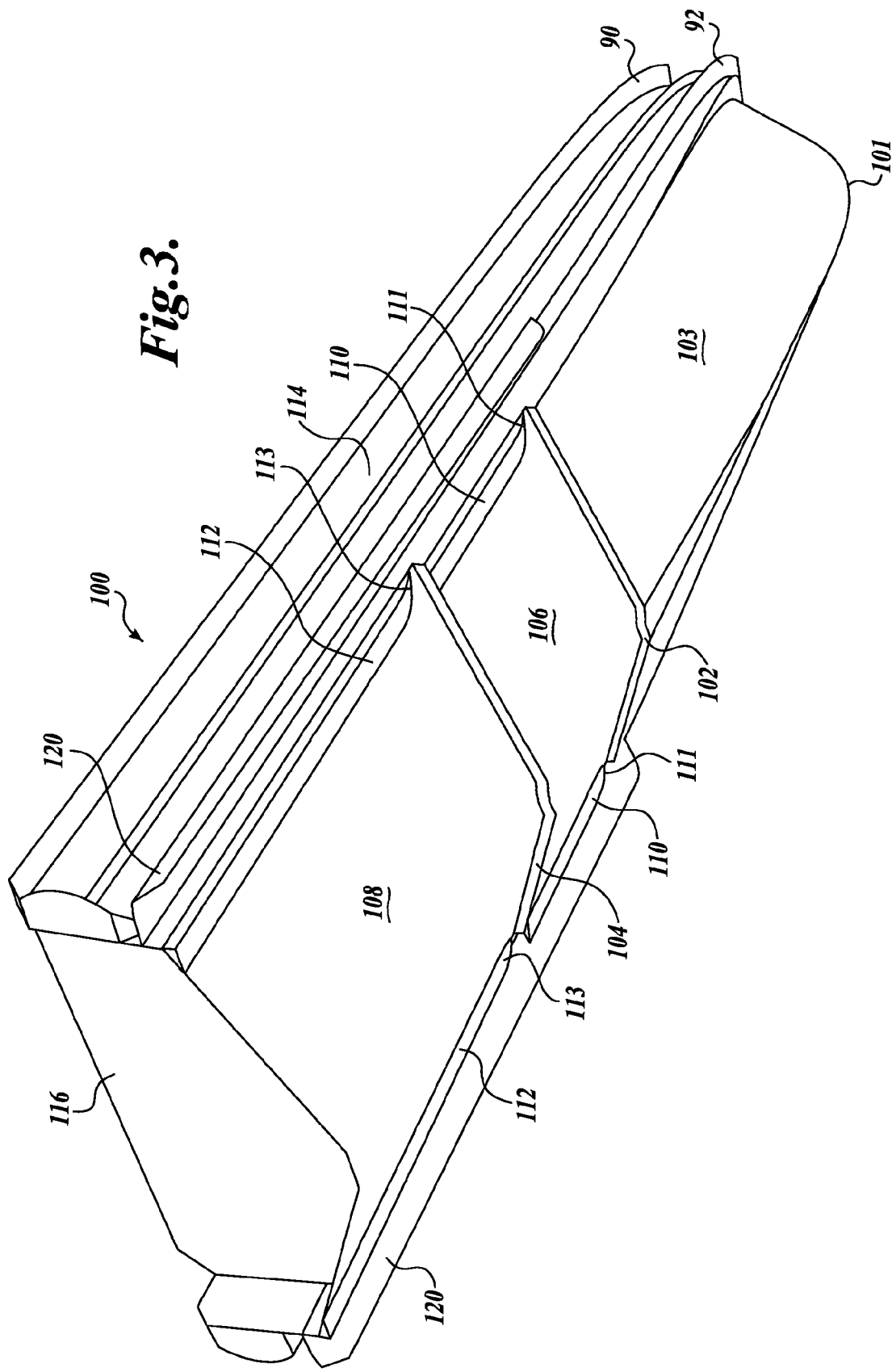
FIG. 3 is a perspective rear, left lower view of the hull shown in FIG. 2.

The stepped hull 100 of the watercraft 99 is shown in FIGS. 2-6. FIG. 2 shows a perspective view of the hull 100 from a generally front-left-lower perspective, and FIG. 3 shows a perspective view from a rear-left-lower perspective. The hull 100 is a planing V-hull having a center keel 101, a first step 102 and a second step 104. The hull may be, for example, a semi-V, a modified-V, a full deep-V, or the like. Although this hull 100 comprises two steps, it will be appreciated to persons of skill in the art that a single step, or more than two steps, may alternatively be provided without departing from the present invention.

The hull includes a forward hull portion 103 located forward of the first step 102. The first step 102 demarcates a first stepped hull portion 106, and the second step 104 demarcates a second stepped hull portion 108. Although not required for the present invention, the hull 100 includes upper flange 90 and lower flange 92 for mounting the foam sponson 98 (see FIG. 1) such as the Foam Stabilized Watercraft disclosed in U.S. Pat. No. 5,282,436, to the present inventor, which is hereby incorporated by reference in its entirety. Although the current embodiment of the invention is applied to a foam stabilized watercraft 99, the invention is suitable for hulls without such sponson.

The first stepped hull portion 106 includes oppositely disposed first outboard strakes 110, one on the port side and the other on the starboard side of the first stepped hull portion 106. Similarly, the second stepped hull portion 108 includes oppositely disposed second outboard strakes 112 (one visible), one on the port side and the other on the starboard side of the second stepped hull portion 108. The outboard strakes 110, 112 in this embodiment are located at (or define a portion of) the hull chine 109, e.g., the location where the side walls 114 meet the stepped hull portion 106 or 108.

In a currently preferred embodiment, the front or leading end 111 of the first outboard strakes 110 and the front or leading end 113 of the second outboard strakes 112 are tapered. The tapered leading ends 111, 113 may optionally be spaced away from the associated first and second steps 102, 104. The tapered leading ends 111, 113 define ports providing a flow path or port for air to enter under the hull 100 near the steps 102, 104.

Figure 4:
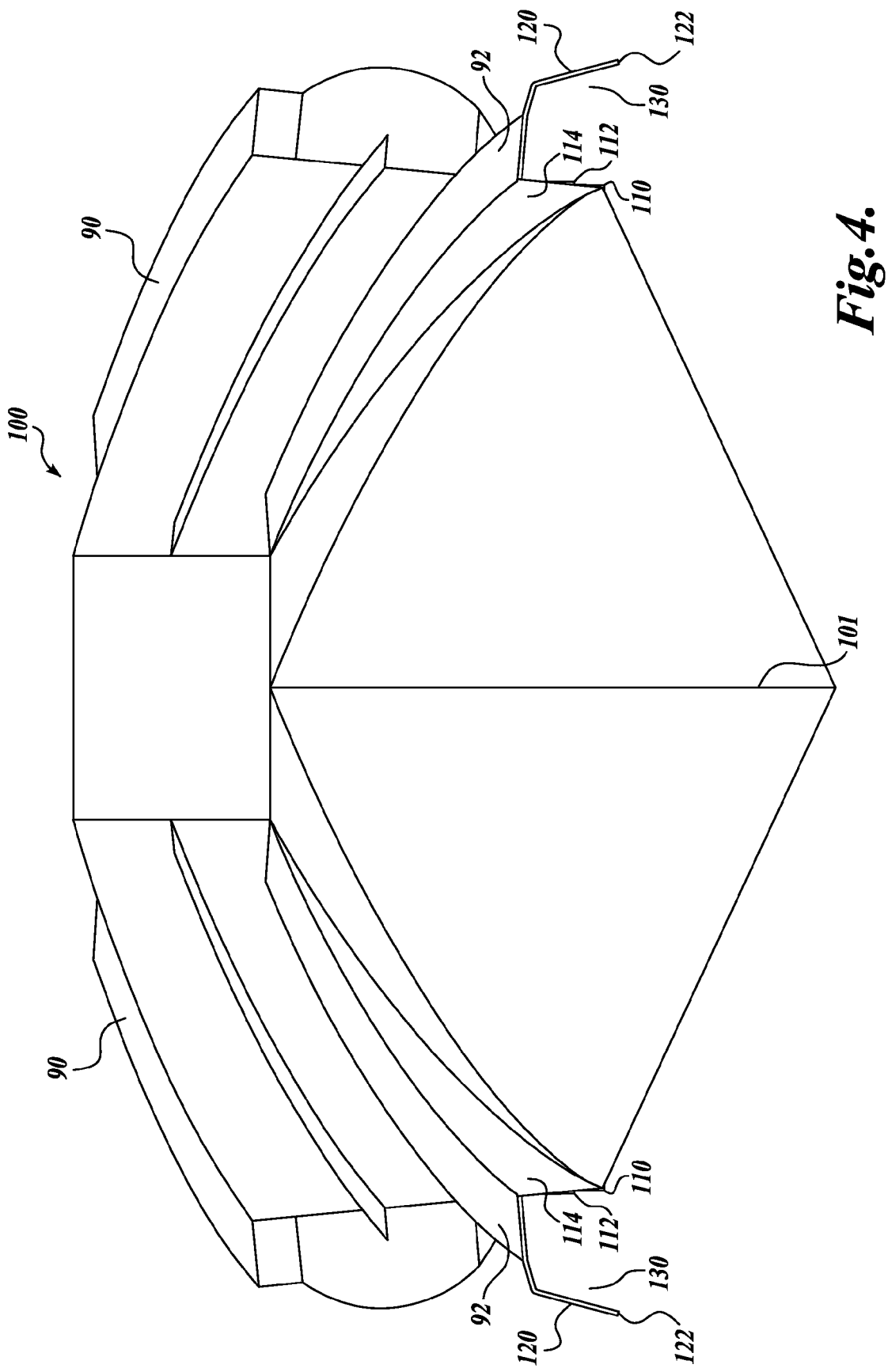
FIG. 4 is a front view of the hull shown in FIG. 2.
Figure 5:
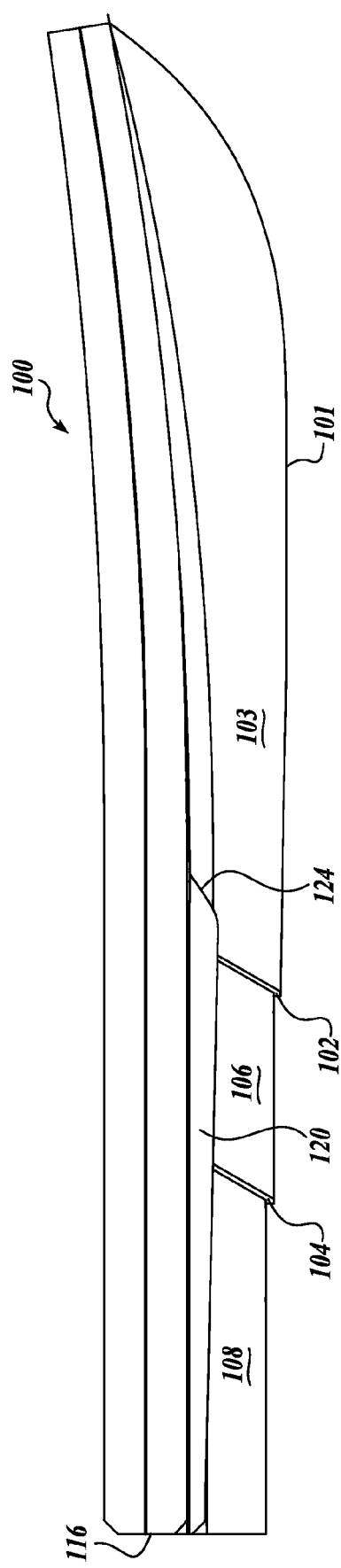
FIG. 5 is a left side view of the hull shown in FIG. 2.

Refer now also to FIG. 4, showing a front view of the hull 100, to FIG. 5, showing a left side view of the hull 100, and to FIG. 6 showing a rear view of the hull 100. Oppositely disposed and outwardly extending ram air fins 120 are attached to the port and starboard side walls 114 of the hull 100, generally along the stepped hull portions 106, 108. The ram air fins 120 are generally L-shaped or arcuate elongate structures that extend outwardly from the side walls 114 and downwardly. For convenience, the ram air fins 120 may be affixed to, or formed integrally with, the lower flanges 92. For example, the ram air fins 120 may be welded to the watercraft 99. As seen most clearly in FIG. 4, the ram air fins 120, cooperatively with the hull side walls 114, define a downwardly open channel 130. The ram air fins 120 are preferably sized such that the distal edge 122 of the ram air fins 120 extend downwardly at least to a horizontal level defined by the lower edges of the outboard strakes 110, 112. In the current hull 100 the ram air fins 120 extend downwardly slightly beyond the level of the strakes 110, 112.

The leading edge 124 of each of the ram air fins 120 (FIG. 5) is preferably located forward of the first step 102, and optionally extends approximately to the transom or aft end 116 of the hull 100. For example, the ram air fins 120 may extend along the aft-most 30% to 50% of the length of the hull 100.

Now the function of the watercraft 99, and in particular the ram air fins 120 will be described. When the hull 100 is moving forward through the water, air enters the channels 130 defined by the ram air fins 120. The entering air is at least partially directed underneath the hull 100, and in particular beneath the first and second stepped hull portions 106, 108.

The planing hull 100 is configures to lift the bow of the watercraft out of the water when the watercraft 99 is operated at higher speeds, for example, in generally straight-line travel. The hydrodynamic forces lift the bow of the planing hull 100 away from the water such that the hull angle with respect to the water increases, i.e., the angle of attack increases as the hull 100 pivots about a horizontal transverse axis. As will be appreciated from FIG. 1, the ram air fins 120, which are fixed to the hull 100, also increase in angle relative to the direction of travel. The increased angle of attack causes air entering the channels 130 is be turned downwardly by the inclined surface of the ram air fins 120, such that the air pressure in the channels 130 increases.

The higher air pressure in the channel 130 increases air flow through the ports defined at the first and second steps 102, 104 by the outboard strakes 110, 112, such that air is forced under the first and second stepped hull portions 106, 108. Increased air flow under the stepped hull portions 106, 108 aids in reducing the effective wetted surface area and thereby decreasing the hydrodynamic drag on the hull 100, improving performance. In addition, it is believed that the aerodynamic forces of the inclined ram air fins 120 will produce an upward force on the ram air fin 120, which will further help to raise the hull 100 out of the water and reduce the wetted area when the hull 100 is in a planing mode.

The reason for the tapered and spaced leading ends 111, 113 of the first and second strakes 110, 112 will now be appreciated. In a current embodiment, the ports defined by the tapered first and second strakes 110, 112 provide a means for preferentially directing air, compressed by the ram air fins 120 as described above, under the hull 100 near the first and second steps 102, 104.

In addition to improving performance of the hull 100 during planing operation, the ram air fins 120 also improve control of the watercraft 99 during turns. As noted above, a common problem with prior art stepped hull watercraft is that when the operator turns the watercraft the hull in some circumstances the hull will undesirably tend to pivot generally about the hull step. This is believed to be caused by the stepped portions of the hull being only in partial contact with the water such that the hull reacts hydrodynamically as if the step were the aft end, or transom, of the hull. This undesirable effect occurs even when the watercraft is trimmed for approximately horizontal operation.

In the hull 100 disclosed herein, however, as the hull 100 is trimmed to level to initiate a turn, the hull inclination or angle of attack decreases. As the inclination angle of the hull 100 decreases, the ram air fin 120 moves towards a horizontal orientation, and therefore no longer presents an inclined surface to the local air flow. The air flowing through the channels 130 is no longer compressed, and therefore the tendency of air to flow into the stepped hull portions 106, 108 is reduced or eliminated. Moreover, the channels 130, which are now disposed near the waterline, will allow water to flow therethrough in level operation. Due to the Bernoulli principle, water flowing through the channels 130 will produce a vacuum at the ports defined by the outboard strakes 110, 112. The vacuum assist provided by the Bernoulli principle advantageously ensures that the stepped hull portions 106, 108 are in good contact with the water, reducing or eliminating any tendency of the watercraft to pivot or turn about one of the steps 102, 104. Therefore, the ram air fins 120 disclosed herein have the very desirable effect of forcing air into the stepped portions of the hull 106, 108 during planing operation, and of drawing air out from under the stepped portions of the hull 106, 108 when the watercraft 99 is in relatively level operation.

Additionally, during turning of the watercraft 99 the tendency of the hull to heel into the turn is counteracted by the ram air fins 120. In particular, the ram air fin 120 located on the inside of the turn radius tends to hydrodynamically resist being submerged into the water. The ram air fin 120 located outwardly from the turn radius may produce a downward force as the outward fin 120 is moving out of the water. The result is that the hull 100 will remain relatively level with the water surface. The first and second stepped hull portions 106, 108 will therefore tend to remain in contact with the water, and the hull will turn in a very stable and predictable manner, even at relatively high speeds.

While illustrative embodiments have been illustrated and described, it will be appreciated that various changes can be made therein without departing from the spirit and scope of the invention.

The invention claimed is:

1. A high-performance watercraft comprising:
   a V-shaped planing hull having a port side, a starboard side, a forward hull portion and a first step defined at an aft end of the forward hull portion, the first step demarcating a first stepped hull portion that is offset from the forward hull portion;
   a first ram air fin fixed to the hull port side, the first ram air fin having a leading edge disposed forward of the first step, wherein the first ram air fin extends from above the first step at least to the first stepped hull portion; and
   a second ram air fin fixed to the hull starboard side, the second ram air fin having a leading edge disposed forward of the first step, wherein the second ram air fin extends from above the first step at least to the first stepped hull portion;
   wherein the first and second ram air fins each define an outboard channel, and further wherein during planing operation of the watercraft the first and second ram air fins are inclined from level such that air entering the outboard channels is aerodynamically pressurized; and
   wherein each of the first and second ram air fins comprise a first leg extending outwardly from the hull and a second leg extending downwardly froth the first leg.

2. The high-performance watercraft of claim 1, further comprising a first pair of oppositely disposed outboard strakes affixed to the first stepped hull portion.

3. The high-performance watercraft of claim 2, wherein the first pair of outboard strakes are tapered at a forward end such that ports to the first stepped hull portion are defined between the strakes and the first step.

4. The high-performance watercraft of claim 1, wherein the first and second ram air fins are oriented such that the ram air fins are approximately horizontal when the watercraft is in a trimmed level configuration.

5. The high-performance watercraft of claim 1, wherein the first and second ram air fins are affixed along an aft end of the watercraft.

6. The high-performance watercraft of claim 5, wherein the first and second ram air fins extend to a transom of the watercraft.

7. The high-performance watercraft of claim 6, wherein the first and second ram air fins extend along 30%-50% of the length of the hull.

8. The high-performance watercraft of claim 1, further comprising a second step defined at an aft end of the first stepped hull portion, the second step demarcating a second stepped hull portion that is upwardly offset from the first stepped hull portion.

9. The high-performance watercraft of claim 8, further comprising a second pair of oppositely disposed outboard strakes affixed to the second stepped hull portion.

10. A watercraft comprising:
    an aluminum hull having a port side wall and a starboard side wall, the hull further comprising a forward hull portion and a first stepped hull portion upwardly offset from the forward hull portion;
    a port arcuate fin extending outwardly from the port side wall and downwardly at least to the first stepped hull portion; and
    a starboard arcuate fin extending outwardly from the starboard side wall and downwardly at least to the first stepped hull portion;
    wherein the port arcuate fin defines a downwardly open elongate channel extending along a portion the port sidewall adjacent the first stepped hull portion, and the starboard arcuate fin defines a downwardly open elongate channel extending along a portion of the starboard side wall adjacent the first stepped hull portion; and
    wherein the port and starboard arcuate fins are configured to compress air during planing operation of the watercraft such that air entering the elongate channels is urged under the first stepped hull portion; and
    wherein the port and starboard arcuate fins are generally L-shaped, comprising a first leg extending outwardly from the hull and a second leu extending downwardly from the first leg.

11. The watercraft of claim 10, further comprising a first strake fixed to an outboard port edge of the first stepped hull portion and a second strake fixed to an outboard starboard edge of the first stepped hull portion.

12. The watercraft of claim 11, wherein the first and second strakes are tapered at a forward end, defining a flow port for compressed air to the first stepped hull portion.

13. The watercraft of claim 10, wherein the port and starboard arcuate fins are angled such that the arcuate fins are approximately horizontal when the watercraft is in a trimmed level configuration.

14. The watercraft of claim 10, wherein the port and starboard arcuate fins are affixed along an aft end of the watercraft.

15. The watercraft of claim 14, wherein the port and starboard arcuate fins extend to a transom of the watercraft.

16. The watercraft of claim 10, wherein the watercraft further comprises a foam sponson disposed along an upper perimeter of the port and starboard side walls.

17. The watercraft of claim 10, wherein the hull further comprises a second stepped hull portion upwardly offset from the first stepped hull portion.

18. The watercraft of claim 17, further comprising a third strake fixed to an outboard port edge of the second stepped hull portion and a fourth strake fixed to an outboard starboard edge of the second stepped hull portion.

* * * * *

UNITED STATES PATENT AND TRADEMARK OFFICE
CERTIFICATE OF CORRECTION

PATENT NO.        : 8,240,268 B2
APPLICATION NO.   : 12/815909
DATED             : August 14, 2012
INVENTOR(S)       : William M. Hansen Page 1 of 1

It is certified that error appears in the above-identified patent and that said Letters Patent is hereby corrected as shown below:

IN THE CLAIMS

| COLUMN | LINE | ERROR |
|---|---|---|
| 5 (Claim 1, | 38 line 23) | "froth the first leg" should read --from the first leg-- |
| 6 (Claim 10, | 30 line 24) | "a second leu" should read --a second leg-- |

Signed and Sealed this
Thirteenth Day of August, 2013

Teresa Stanek Rea
*Acting Director of the United States Patent and Trademark Office*